United States Patent
Sato

(10) Patent No.: US 7,414,657 B2
(45) Date of Patent: Aug. 19, 2008

(54) IMAGE CAPTURE APPARATUS HAVING DISPLAY DISPLAYING CORRECTLY ORIENTED IMAGES BASED ON ORIENTATION OF DISPLAY, IMAGE DISPLAY METHOD OF DISPLAYING CORRECTLY ORIENTED IMAGES, AND PROGRAM

(75) Inventor: Yoshinobu Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 10/950,884

(22) Filed: Sep. 27, 2004

(65) Prior Publication Data

US 2005/0073600 A1    Apr. 7, 2005

(30) Foreign Application Priority Data

Oct. 1, 2003    (JP) .............................. 2003-343722

(51) Int. Cl.
H04N 5/222 (2006.01)
(52) U.S. Cl. .............................. 348/333.06; 348/333.02
(58) Field of Classification Search ............ 348/333.01, 348/333.02, 333.06, 373, 375, 376
See application file for complete search history.

(56) References Cited

U.S. PATENT DOCUMENTS

| | | | |
|---|---|---|---|
| 5,559,554 A | | 9/1996 | Uekane et al. |
| 5,742,341 A | * | 4/1998 | Ohishi et al. ................. 348/373 |
| 6,518,956 B1 | * | 2/2003 | Sato ........................... 345/173 |
| 6,597,400 B2 | * | 7/2003 | Nishimura ............. 348/333.02 |
| 6,912,005 B2 | * | 6/2005 | Senda ................... 348/333.06 |

FOREIGN PATENT DOCUMENTS

| | | |
|---|---|---|
| EP | 0656726 | 6/1995 |
| EP | 1564968 | 8/2005 |
| JP | 7-154692 | 6/1995 |
| JP | 11275395 | 10/1999 |

\* cited by examiner

*Primary Examiner*—Justin P Misleh
(74) *Attorney, Agent, or Firm*—Canon USA Inc IP Div

(57) ABSTRACT

An image capture apparatus capable of generating a mirror image of a captured image and superimposing character patterns on the mirror image. The image capture apparatus includes an image capture device and a display device. The display device is rotatably coupled to the image capture device such that the display device can rotate between a normal position and self-portrait position. When in the self-portrait position, the display device displays a mirror image of the captured image, a superimposed character pattern, and an operation condition pattern. Furthermore, the image capture apparatus includes operation devices that are inhibited from operating by a user when in the self-portrait mode.

11 Claims, 8 Drawing Sheets

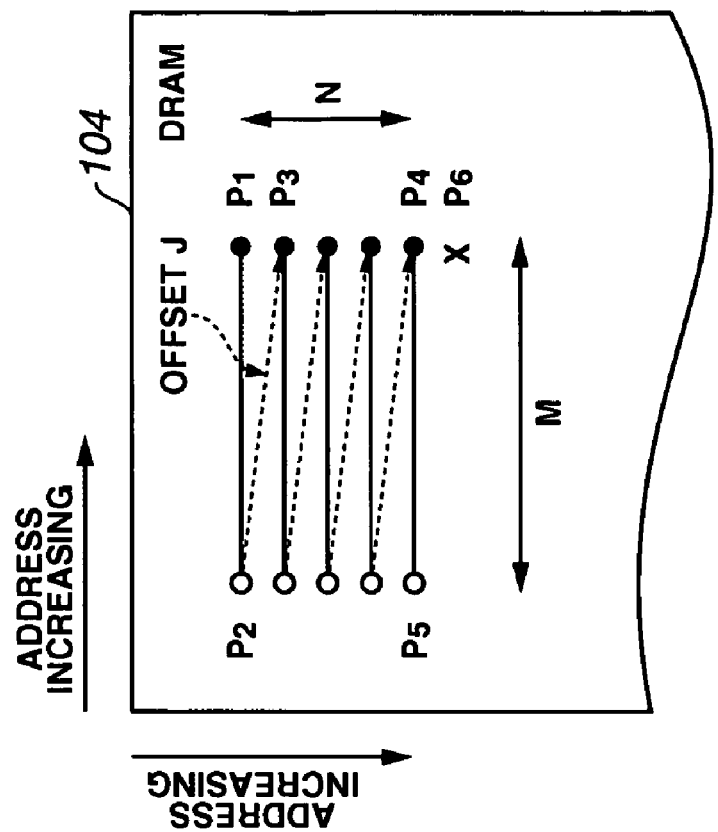
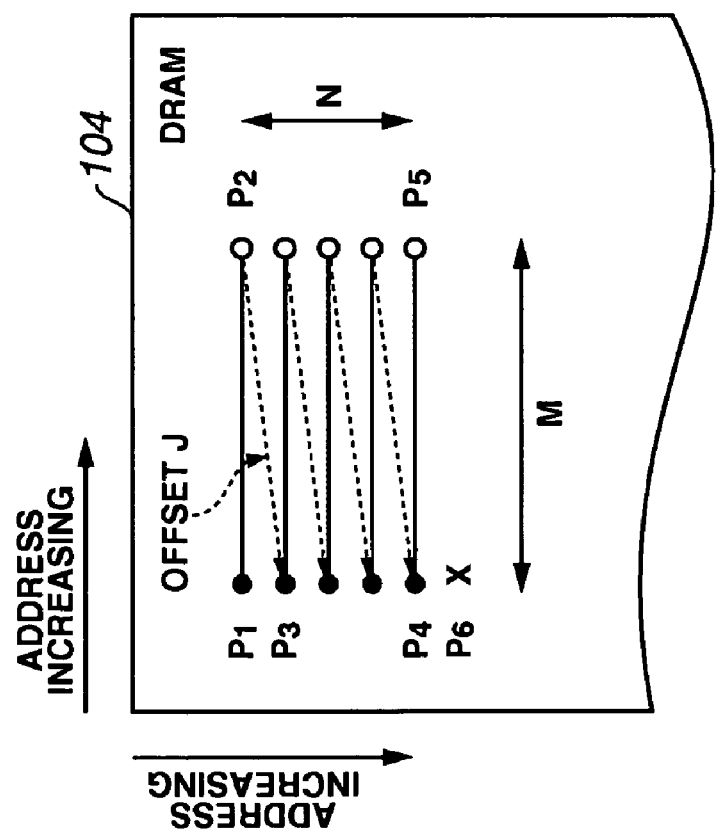

IMAGE CAPTURE APPARATUS HAVING DISPLAY DISPLAYING CORRECTLY ORIENTED IMAGES BASED ON ORIENTATION OF DISPLAY, IMAGE DISPLAY METHOD OF DISPLAYING CORRECTLY ORIENTED IMAGES, AND PROGRAM

CROSS-REFERENCE TO RELATED APPLICATIONS

This application claims priority from Japanese Patent Application No. 2003-343722 filed Oct. 1, 2003, which is hereby incorporated by reference herein.

BACKGROUND OF THE INVENTION

1. Field of the Invention

The present invention relates to an image capture apparatus, and more specifically to an image capture apparatus capable of capturing images in normal and self-portrait shooting modes.

2. Description of Related Art

Generally, most digital cameras include an image-capture section and a display section. The image-capture section includes a camera lens for use in photo-taking a subject. The display section includes a monitor screen to display thereon an image captured by the image-capture section or an image reproduced from a recording medium.

Some digital cameras have the display section coupled to the image-capture section via a joint portion such that the display section is rotatable with respect to the image-capture section. These digital cameras allow for both normal shooting and self-portrait shooting. In normal shooting, the direction in which the camera lens faces is opposite to the direction in which the monitor screen faces. In self-portrait shooting in which the photographer can photograph himself, the direction of the camera lens faces in the same direction as the monitor screen.

In digital cameras allowing such self-portrait shooting, it is necessary, during self-portrait shooting, to horizontally reverse an image captured by the image-capture section and display the reversed image on the monitor screen in a mirror image fashion. Therefore, these digital cameras are equipped with an LCD (liquid crystal device) controller having a horizontally-reversing function (hereinafter referred to as a "mirror-image display function").

In addition, most digital cameras are commonly equipped with a superimpose control circuit. The superimpose control circuit superimposes a character information pattern, such as date, time, manipulation information, warning information about operating conditions of the digital camera, etc., on an image displayed on the monitor screen of the digital camera.

If the superimposed character information pattern as described above is also displayed in a mirror image fashion when the mirror-image display function is performed in a digital camera allowing self-portrait shooting, horizontally-reversed characters will be output to the monitor screen. In order to overcome this problem, it has been proposed, for example, in Japanese Laid-Open Patent Application No. Hei 7-154692 (corresponding U.S. Pat. No. 5,559,554), to further apply horizontally-reversing processing to the character information pattern so as to output a character information pattern that is normally recognizable on the monitor screen.

However, there is a problem associated with this proposal that reapplying of horizontally-reversing processing to the character information pattern during self-portrait shooting necessitates an additional circuit for performing such processing, thereby causing an increase in circuitry scale and an increase in cost.

In addition, part of operation members (buttons) disposed on a digital camera are provided on the assumption that they are operated by a photographer during normal shooting. Therefore, in the above-described conventional digital camera, if the photographer operates these operation members when the monitor section is in the self-portrait shooting posture, a problem may arise. For instance, an image erase button that the photographer should operate while viewing a captured image on the monitor screen is one of the above-described operation members.

Furthermore, most of indication members disposed on a digital camera are placed on the back side of the digital camera on the assumption that they are operated by a photographer during normal shooting. Therefore, in the above-described conventional digital camera, a problem arises in that the photographer cannot see these indication members when the display section is in the self-portrait shooting posture. For instance, an indication member, such as an LED, for indicating the focusing state of the digital camera is one of the above-described indication members.

SUMMARY OF THE INVENTION

The present invention is directed to an image capture apparatus capable of displaying, on a monitor screen, a captured image and a character information pattern in a correct orientation when a monitor screen is in the self-portrait shooting posture, without need for an additional circuit for horizontal-reverse processing, and to an image display method and a program adapted for use with such an image capture apparatus.

In one aspect of the present invention, the image capture apparatus includes an image capture device operable to capture the image and output an image signal corresponding to the captured image; a display device operable to display a displayed image; a reversing device generating a mirror image of the captured image from the image signal; and a controller controlling the display device to display the displayed image.

In one embodiment, the display device is rotatably coupled to the image capture device such that the display device can rotate between first and second positions. Responsive to the display device being in the first position, the controller controls the display device to display the captured image. Responsive to the display device being in the second position, the controller controls the display device to display the mirror image.

In another embodiment, the image capture apparatus is capable of preventing a user from operating an operation member that may cause a problem if operated when the monitor screen is in the self-portrait shooting posture. The image capture apparatus includes an inhibition device inhibiting operation of the operation device by the user responsive to the display device being in the second position.

In another embodiment, the image capture apparatus includes the controller controlling the display device to display the displayed image including an operation condition display pattern corresponding to an operating condition of the image capture apparatus responsive to the display device being in the second position. Also, the image capture apparatus includes a condition display device mounted on a back side of the image capture device operable to display the operating condition of the image capture apparatus responsive to the display device being in the first position.

The above and further features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A and 5B are diagrams illustrating the memory structure of a DRAM.

DETAILED DESCRIPTION OF THE EMBODIMENTS

Embodiments of the invention will be described in detail below with reference to the drawings.

Figure 1:
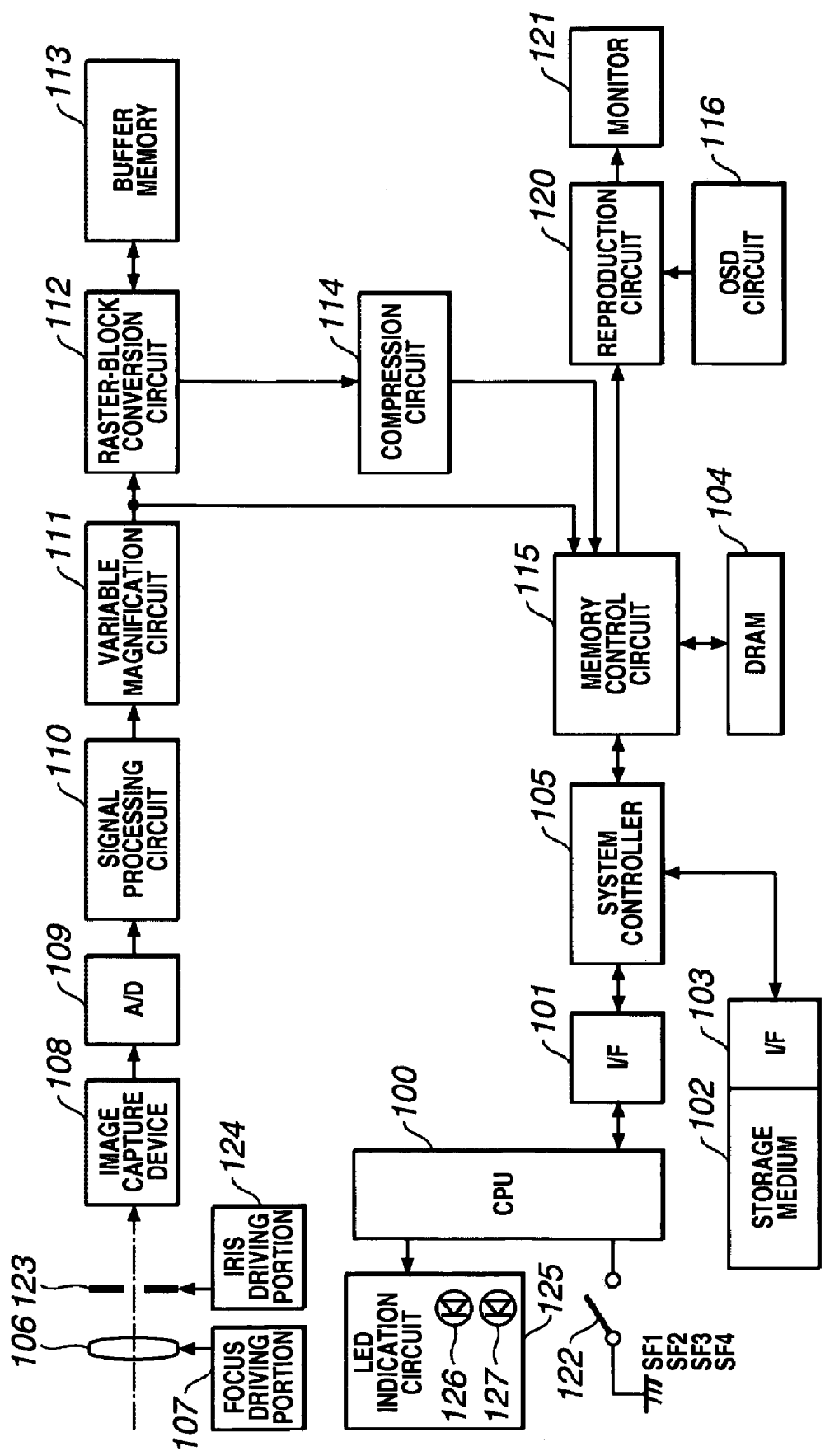
FIG. 1 is a block diagram showing the components of an image capture apparatus according to an exemplary embodiment of the invention.

FIG. 1 is a block diagram showing components of an image capture apparatus (digital camera) according to an exemplary embodiment of the invention.

Referring to FIG. 1, the image capture apparatus includes a CPU (central processing unit) 100, an interface circuit (I/F) 101, a storage medium 102, an interface circuit (I/F) 103, a DRAM (dynamic random access memory) 104, a system controller 105, a photo-taking lens 106, a focus driving portion 107, an iris 123, and an iris driving portion 124. The CPU 100 controls the image capture apparatus. The I/F 101 is provided for the CPU 100. The storage medium 102 includes a memory card or the like. The I/F 103 is provided for the storage medium 102. The DRAM 104 is a memory for storing image data, programs, etc. . . . . The system controller 105 exercises control over a sequential operation, bus arbitration, etc., of the image capture apparatus.

The image capture apparatus further includes an image capture device 108, an A/D converter 109, a signal processing circuit 110, a variable magnification circuit 111, a raster-block conversion circuit 112, a buffer memory 113 and a compression circuit 114. The image capture device 108 is a one-chip CCD (charge-coupled device). The A/D converter 109 converts an analog signal into a digital signal. The variable magnification circuit 111 applies horizontal and vertical reduction processing to image data by use of subsampling processing, linear interpolation processing, etc. . . . . The raster-block conversion circuit 112 converts raster-scanning image data reduced by the variable magnification circuit 111 into block-scanning image data. The buffer memory 113 is used for the raster-block conversion circuit 112 to convert raster-scanning data into block-scanning data. The compression circuit 114 compresses JPEG data on a block-by-block basis.

The image capture apparatus further includes a memory control circuit 115 and a reproduction circuit 120. The memory control circuit 115 controls the variable magnification circuit 111, the reproduction circuit 120 and the DRAM 104.

The memory control circuit 115 also controls transfer of raster data output from the variable magnification circuit 111 to the DRAM 104 and transfer of an output signal of the compression circuit 114 to the DRAM 104.

The image capture apparatus further includes an on-screen display (hereinafter referred to as "OSD") circuit 116. The OSD circuit 116 outputs a character signal corresponding to character data transmitted from the CPU 100.

The reproduction circuit 120 generates a video signal by superimposing OSD data onto image data and applying modulation, addition of a synchronizing signal, D/A conversion, etc. . . . to the image data subjected to superimposition.

The image capture apparatus further includes a monitor 121. The monitor 121 displays an image based on the video signal generated by the reproduction circuit 120.

The image capture apparatus further includes a switch group 122. The switch group 122 includes a switch SF1, a switch SF2, a switch SF3, a switch SF4, etc . . . , which are connected to the CPU 100.

The image capture apparatus further includes an LED indication circuit 125. The LED indication circuit 125 is provided for turning on LEDs (light emitting diodes) to give notice or warning, and includes an LED 126 and an LED 127, which are further described later with reference to FIG. 2.

The details of the switch group 122 are described as follows.

The switch SF1 is a rotation-angle detecting switch configured to output an ON signal when the monitor 121 is in a self-portrait shooting posture (the monitor 121 faces in the same direction as the photo-taking lens 106). In response to this ON signal being input to the CPU 100, an image that has been displayed on the monitor 121 when the monitor 121 is in a normal shooting posture (the monitor 121 faces in a direction opposite to the direction in which the photo-taking lens 106 faces) is horizontally reversed, and the reversed image is displayed on the monitor 121.

The switch SF2 is a switch for starting automatic focusing. In response to the switch SF2 being turned on by the photographer, an automatic focusing operation starts.

The switch SF3 is a menu switch for switching settings of the image capture apparatus. In response to the switch SF3 being turned on by the photographer, the image capture apparatus comes into a mode allowing the photographer to switch settings of the image capture apparatus.

The switch SF4 is an erase switch for erasing image data. In response to the switch SF4 being turned on by the photographer, captured image data is erased.

Figure 2:
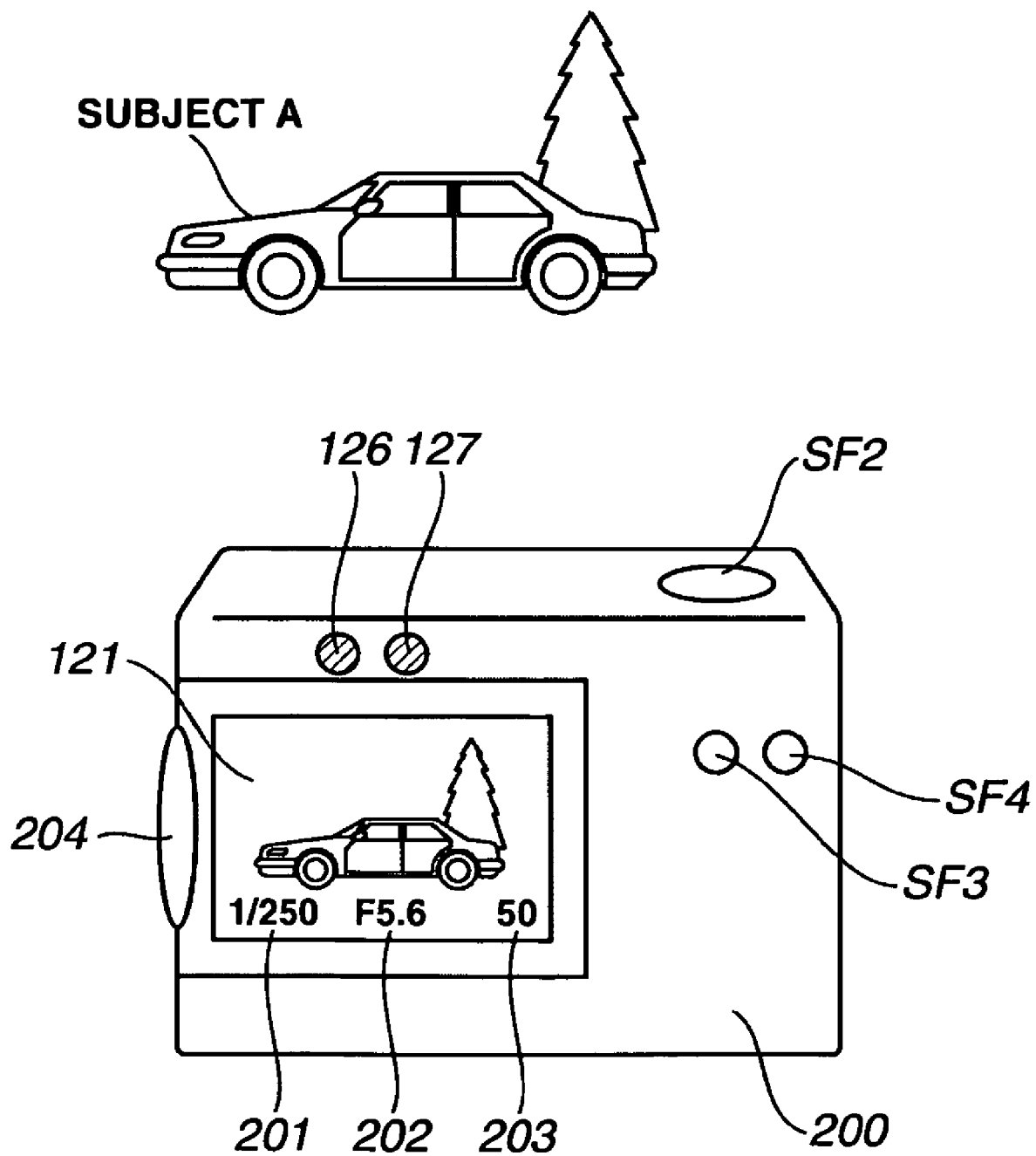
FIG. 2 is a view as seen from the back side of the image capture apparatus, showing the condition where a video image of a subject is displayed on a monitor when the image capture apparatus is in the normal shooting mode.

FIG. 2 is a view as seen from the back side of the image capture apparatus, showing the condition where a video image of a subject A is displayed on the monitor 121 when the image capture apparatus is in the normal shooting mode.

Referring to FIG. 2, the image capture apparatus has a camera section 200 for photo-taking a subject. The monitor 121, which displays an image of the photo-taken subject, is coupled to the camera section 200 via a joint portion 204. The monitor 121 is configured to be rotatable with respect to the camera section 200.

Although not shown in FIG. 2, the joint portion 204 is coupled with the rotation-angle detecting switch SF1, which detects a relative rotation angle of the monitor 121 with respect to the camera section 200. The rotation-angle detecting switch SF1 outputs to the CPU 100 an OFF signal when the rotated position of the monitor 121 is a position in the normal shooting posture, and an ON signal when it is a position in the self-portrait shooting posture.

On the monitor 121, a shutter speed (1/250) 201, an aperture value (F5.6) 202 and a remaining number of recordable frames (50) 203, which are parameters used for capturing a still image, are displayed while being superimposed on a photo-taken subject image.

The scanning direction of the monitor 121 in the normal shooting posture is the same as that of a television screen, i.e., from left to right and from top to bottom in FIG. 2.

The LED 126 is provided for indicating a focusing state. The LED 126 is turned on in the case of an in-focus state, and blinks in the case of an out-of-focus state.

The LED 127 is provided for indicating a camera-shake state (i.e., a state in which a captured image blurs due to the vibration of a hand holding the image capture apparatus). The LED 127 indicates the camera-shake state by blinking when the shutter speed is set slower than a prescribed speed so that camera shake is likely to occur.

Figure 3:
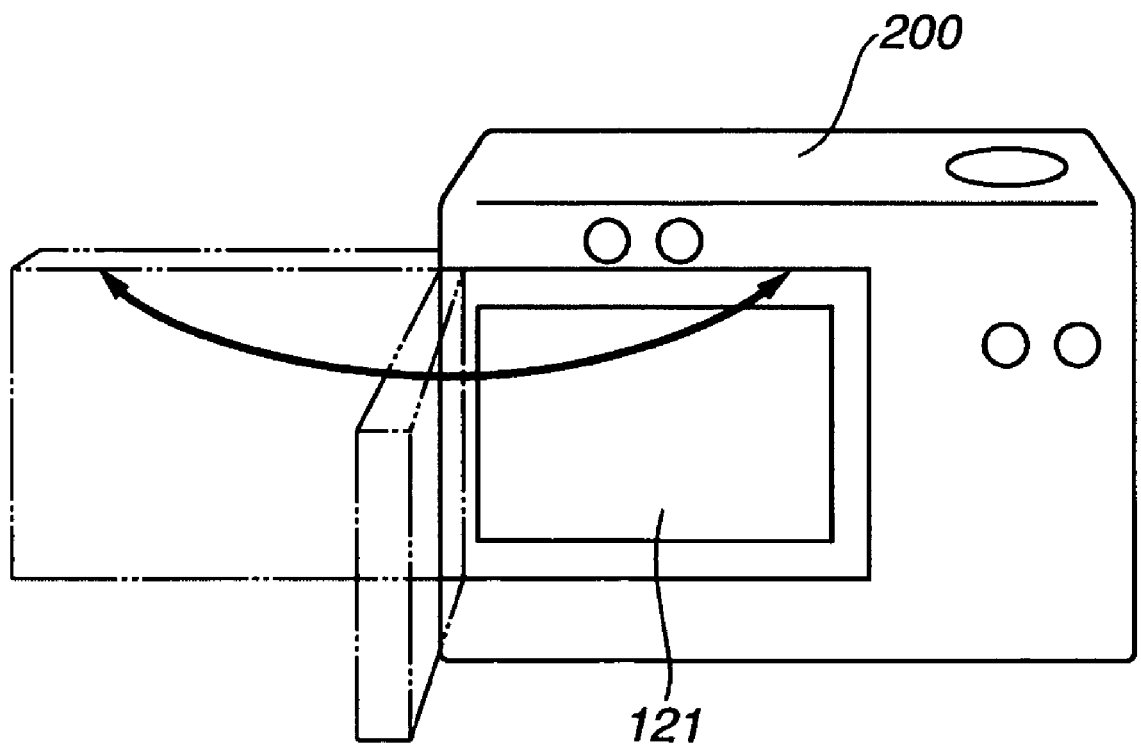
FIG. 3 is a view as seen from the back side of the image capture apparatus, showing the state where the monitor is rotatable around a joint portion of the image capture apparatus.

FIG. 3 is a view as seen from the back side of the image capture apparatus, showing the state where the monitor 121 is rotatable around the joint portion 204 with respect the camera section 200.

Figure 4:
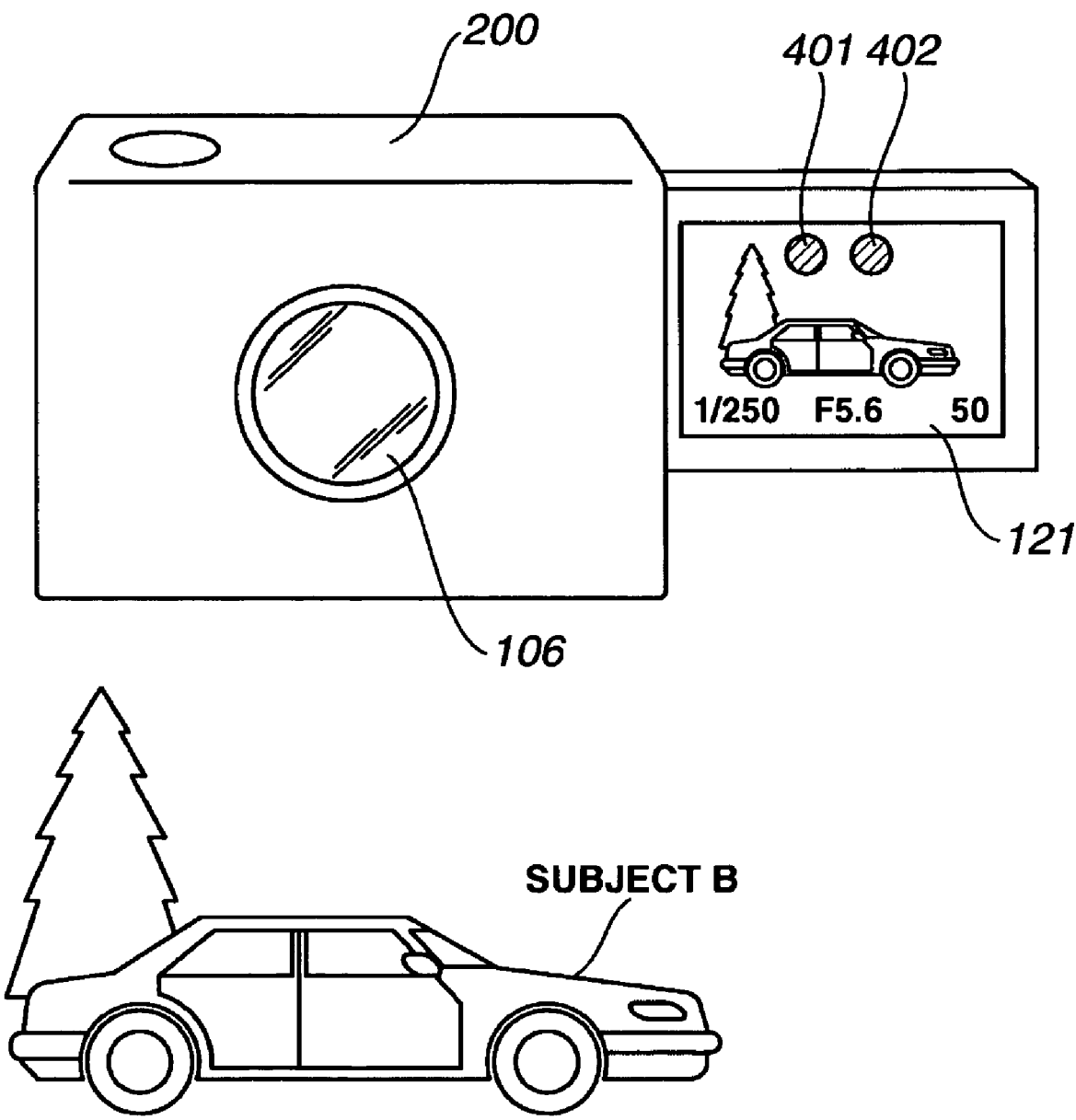
FIG. 4 is a view as seen from the front of the image capture apparatus, showing the self-portrait shooting mode in which the monitor faces in the same direction as a photo-taking lens.

FIG. 4 is a view as seen from the front of the image capture apparatus, showing the self-portrait shooting mode in which the monitor 121 faces in the same direction as the photo-taking lens 106.

If the monitor 121 is rotated 180° in the horizontal direction around the joint portion 204 while the camera section 200 is held upright in the normal shooting mode, the image capture apparatus comes into the self-portrait shooting mode. In the self-portrait shooting mode, the scanning direction on an image plane of the monitor 121 is made opposite to that described in FIG. 2, so that a video image of a subject B is displayed on the monitor 121 as a mirror image in which an original image is horizontally reversed.

In addition, in the self-portrait shooting mode, an indication corresponding to the focusing-state indication by the LED 126 shown in FIG. 2 is effected by an OSD lighting indication 401 on the monitor 121. Also, an indication corresponding to the camera-shake-state indication by the LED 127 shown in FIG. 2 is effected by an OSD lighting indication 402 on the monitor 121. Accordingly, even when the image capture apparatus is in the self-portrait shooting mode where the photographer cannot view the LEDs 126 and 127, the photographer can determine whether or not the photo-taking lens 106 is in an in-focus state and whether or not the image capture apparatus is in the camera-shake state.

FIGS. 5A and 5B are diagrams illustrating the memory structure of the DRAM 104. Data transfer by the memory control circuit 115 is described as follows with reference to the memory structure of the DRAM 104.

The memory control circuit 115 regards the DRAM 104 as a two-dimensional plane and performs data transfer (writing of image data) to a rectangular area on the DRAM 104.

FIG. 5A illustrates image data transfer performed when the image capture apparatus is in the normal shooting mode. In FIG. 5A, points P1, P2, P3, P4, P5 and P6 denote addresses. Reference character N denotes the number of lines in the rectangular area to which data is transferred. Reference character M denotes the number of pixels (the number of words) of one line. Values of all distances (offsets) J indicated by broken lines are the same, each being equal to "P3−P2". Data transfer to the rectangular area is effected by sequentially writing image data for M words from each of the leftmost addresses P1, P2, P3, . . . P4 toward increased addresses over N times from the top line to the bottom line.

FIG. 5B illustrates image data transfer performed when the image capture apparatus is in the self-portrait shooting mode. In FIG. 5B, as in FIG. 5A, points P1, P2, P3, P4, P5 and P6 denote addresses. Reference character N denotes the number of lines in the rectangular area to which data is transferred. Reference character M denotes the number of pixels (the number of words) of one line. Values of all distances (offsets) J indicated by broken lines are the same, each being equal to "P3−P2". It should be noted that the addresses P1 to P6 shown in FIG. 5B have respective values completely different from those of the addresses P1 to P6 shown in FIG. 5A, and the values N, M and J shown in FIG. 5B are not always respectively the same as the values N, M and J shown in FIG. 5A. However, similar reference characters are used here for the sake of simplicity.

In FIG. 5B, data transfer to the rectangular area is effected by sequentially writing image data for M words from each of the rightmost addresses P1, P2, P3, . . . P4 toward decreased addresses over N times from the top line to the bottom line. In other words, the direction of scanning of lines in data transfer at the time of the self-portrait shooting mode shown in FIG. 5B is opposite to that in data transfer at the time of the normal shooting mode shown in FIG. 5A.

Figure 6:
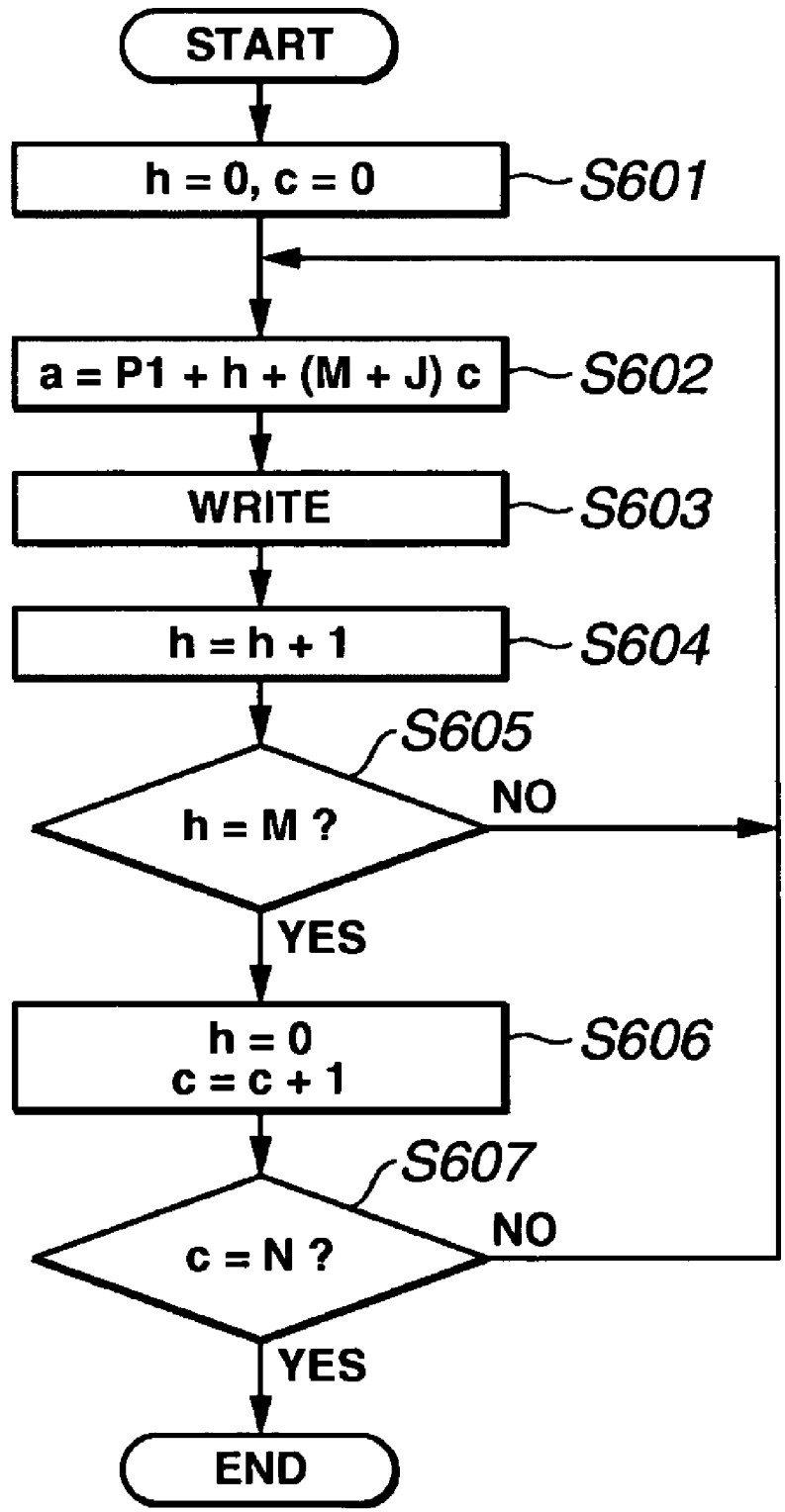
FIG. 6 is a flow chart illustrating the sequence of image data transfer during the normal shooting mode performed by a memory control circuit in a rectangular area on the DRAM shown in FIG. 5A.

FIG. 6 is a flow chart illustrating the sequence of image data transfer during the normal shooting mode performed by the memory control circuit 115 in the rectangular area on the DRAM 104 shown in FIG. 5A. It should be noted that values P1, M, N and J shown in FIG. 6 correspond respectively to the address P1, the number M of pixels, the number N of lines and the distance J shown in FIG. 5A. These values are previously set at setting registers of the memory control circuit 115.

Referring to FIG. 6, at step S601, the memory control circuit 115 first resets counter values "h" and "c" (h=0, c=0). Next, at step S602, the memory control circuit 115 computes an address "a" on the basis of the following equation:

$$a=P1+h+(M+J)c$$

At step S603, the memory control circuit 115 writes image data to an area on the DRAM 104 designated by the address "a" computed at step S602.

At step S604, the memory control circuit 115 increments the counter value "h" by one (h=h+1). At the next step S605, the memory control circuit 115 makes a check to determine whether the counter value "h" is equal to the number M of pixels (words) on one line (h=M). If it is determined that the counter value "h" is equal to the number M of pixels, i.e., a writing process for one line is completed, the flow proceeds to step S606. At step S606, the memory control circuit 115 resets the counter value "h" (h=0) and increments the counter value "c" by one (c=c+1). At the next step S607, the memory control circuit 115 makes a check to determine whether the counter value "c" is equal to the number N of lines in the rectangular area (c=N). If it is determined that the counter value "c" is equal to the number N of lines, i.e., image data for all the lines have been transferred, the memory control circuit 115 brings the present processing operation to an end.

On the other hand, if it is determined at step S605 that the counter value "h" is not equal to the number M of pixels, or if it is determined at step S607 that the counter value "c" is not equal to the number N of lines, the flow returns to step S602.

By the above-described sequence shown in FIG. 6, image data transfer (writing of image data to the DRAM 104) during the normal shooting mode can be realized.

Figure 7:
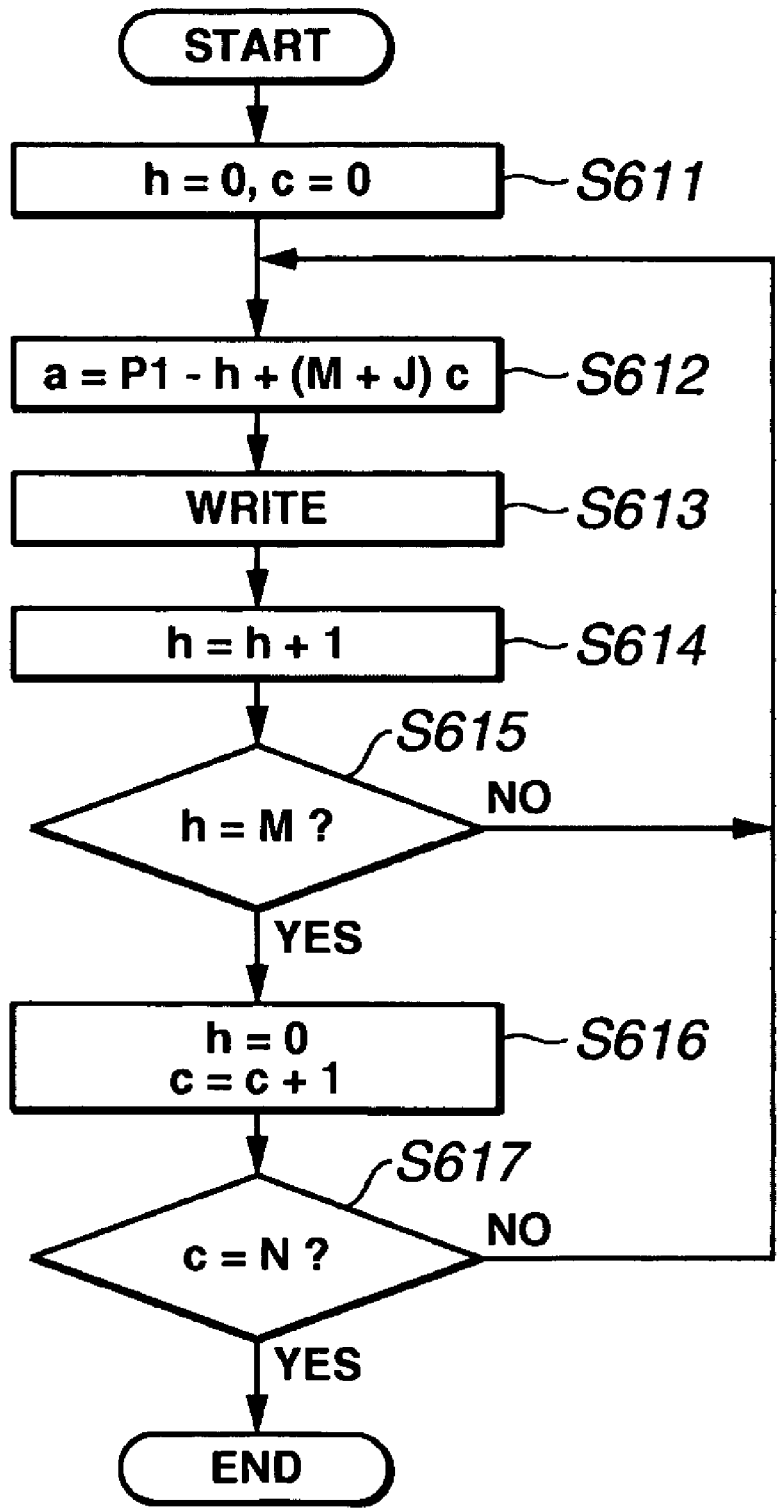
FIG. 7 is a flow chart illustrating the sequence of image data transfer during the self-portrait shooting mode performed by the memory control circuit in a rectangular area on the DRAM shown in FIG. 5B.

FIG. 7 is a flow chart illustrating the sequence of image data transfer during the self-portrait shooting mode performed by the memory control circuit 115 in the rectangular area on the DRAM 104 shown in FIG. 5B. It should be noted that values P1, M, N and J shown in FIG. 7 correspond respectively to the address P1, the number M of pixels, the number N of lines and the distance J shown in FIG. 5B. These values are previously set at setting registers of the memory control circuit 115.

Referring to FIG. 7, at step S611, the memory control circuit 115 first resets counter values "h" and "c" (h=0, c=0). Next, at step S612, the memory control circuit 115 computes an address "a" on the basis of the following equation:

$$a = P1 - h + (M+J)c$$

At step S613, the memory control circuit 115 writes image data to an area on the DRAM 104 designated by the address "a" computed at step S612.

At step S614, the memory control circuit 115 increments the counter value "h" by one (h=h+1). At the next step S615, the memory control circuit 115 makes a check to determine whether the counter value "h" is equal to the number M of pixels (words) on one line (h=M). If it is determined that the counter value "h" is equal to the number M of pixels, i.e., a writing process for one line is completed, the flow proceeds to step S616. At step S616, the memory control circuit 115 resets the counter value "h" (h=0) and increments the counter value "c" by one (c=c+1). At the next step S617, the memory control circuit 115 makes a check to determine whether the counter value "c" is equal to the number N of lines in the rectangular area (c=N). If it is determined that the counter value "c" is equal to the number N of lines, i.e., image data for all the lines have been transferred, the memory control circuit 115 brings the present processing operation to an end.

On the other hand, if it is determined at step S615 that the counter value "h" is not equal to the number M of pixels, or if it is determined at step S617 that the counter value "c" is not equal to the number N of lines, the flow returns to step S612.

By the above-described sequence shown in FIG. 7, image data transfer (writing of image data to the DRAM 104) during the self-portrait shooting mode can be realized.

Photo-taking operation of the image capture apparatus according to the exemplary embodiment of the invention is now described along with operation of displaying a captured image and a character information pattern with reference to FIG. 1 as follows.

The photo-taking lens 106 is driven along its optical axis by the focus driving portion 107 to perform focus adjustment. The aperture area of the iris 123, which is located on the optical axis of the photo-taking lens 106, is adjusted by the iris driving portion 124. The image capture device 108 is also located on the optical axis of the photo-taking lens 106, so that a photo-taken image of a subject (not shown) by the photo-taking lens 106 is formed on an imaging plane of the image capture device 108. The image capture device 108 employed for this embodiment has a greater number of pixels than the number of pixels of the monitor 121.

A subject image formed on the imaging plane of the image capture device 108 is photoelectrically converted into analog CCD signals by the image capture device 108. The analog CCD signals are sequentially read out from the image capture device 108 and are then converted into a digital image signal by the A/D converter 109. The digital image signal is supplied to the signal processing circuit 110. The signal processing circuit 110 includes a white-balance adjusting circuit, a gamma correction circuit, a YC (luminance/chrominance) processing circuit and an exposure/focusing (AE/AF) circuit. The image signal supplied to the signal processing circuit 110 is processed by these circuits and then output therefrom as image data. The image data is supplied to the variable magnification circuit 111. Further, the signal processing circuit 110 contains an extraction circuit for extracting a luminance signal component and an AE data producing circuit. The extraction circuit extracts a luminance signal component from the image signal. The AE data producing circuit produces AE data as exposure information from the extracted luminance signal component. The AE data thus produced is supplied to the CPU 100. The signal processing circuit 110 further contains an AF data producing circuit composed of a band-pass filter and an integrator. The above luminance signal component as extracted is supplied to the AF data producing circuit. In the AF data producing circuit, only a high-frequency component is extracted from the luminance signal component by the band-pass filter. The extracted high-frequency component is integrated by the integrator to produce AF data as focusing information. The AF data thus produced is also supplied to the CPU 100.

The variable magnification circuit 111 performs sub-sampling, linear interpolation processing, etc. . . . , of pixel data of a captured image in accordance with the display size of the monitor 121. In particular, the variable magnification circuit 111 reduces the size of image data supplied from the signal processing circuit 110 both in the horizontal direction and the vertical direction to output overall-reduced image data to the memory control circuit 115.

The CPU 100 causes the memory control circuit 115 to effect processing of the sequence shown in FIG. 6 when the monitor 121 is in the normal shooting posture shown in FIG. 2. The memory control circuit 115 sequentially writes, to addresses "a" on the DRAM 104, image data according with the display size supplied from the variable magnification circuit 111. Accordingly, overall-reduced image data are written into the DRAM 104, as shown in FIG. 5A.

When the monitor 121 is in the self-portrait shooting posture shown in FIG. 4, the CPU 100 causes the memory control circuit 115 to effect processing of the sequence shown in FIG. 7. The memory control circuit 115 sequentially writes, to addresses "a" on the DRAM 104, image data according with the display size supplied from the variable magnification circuit 111. Accordingly, overall-reduced image data representing a mirror image in which an original image is horizontally reversed are written into the DRAM 104, as shown in FIG. 5B.

There is no difference in reading out overall-reduced image data from the DRAM 104 between the normal shooting mode and the self-portrait shooting mode. The memory control circuit 115 sequentially reads out the overall-reduced image data stored in the DRAM 104 from the leftmost address to the rightmost address and from the top line to the bottom line on the two-dimensional plane of the DRAM 104 (the same scanning direction as the writing action shown in FIG. 5A). Then, the memory control circuit 115 outputs the read-out image data to the reproduction circuit 120.

The reproduction circuit 120 superimposes a character information pattern signal supplied from the OSD circuit 116 on the photo-taken image data supplied from the memory control circuit 115. Then, the reproduction circuit 120 applies, to the image data subjected to superimposition, signal processing, such as chroma encoding, bandwidth correction, conversion into a composite signal, etc. Further, the reproduction circuit 120 converts the image data into a television (TV) analog signal and outputs the TV analog signal as a video signal to the monitor 121.

With the image capture apparatus according to the embodiment configured as described above, in the case of the self-portrait shooting mode, a photo-taken image is displayed as a mirror image in which an original image is horizontally reversed, but a character information pattern superimposed on the photo-taken image is displayed without being horizontally reversed.

Figure 8:
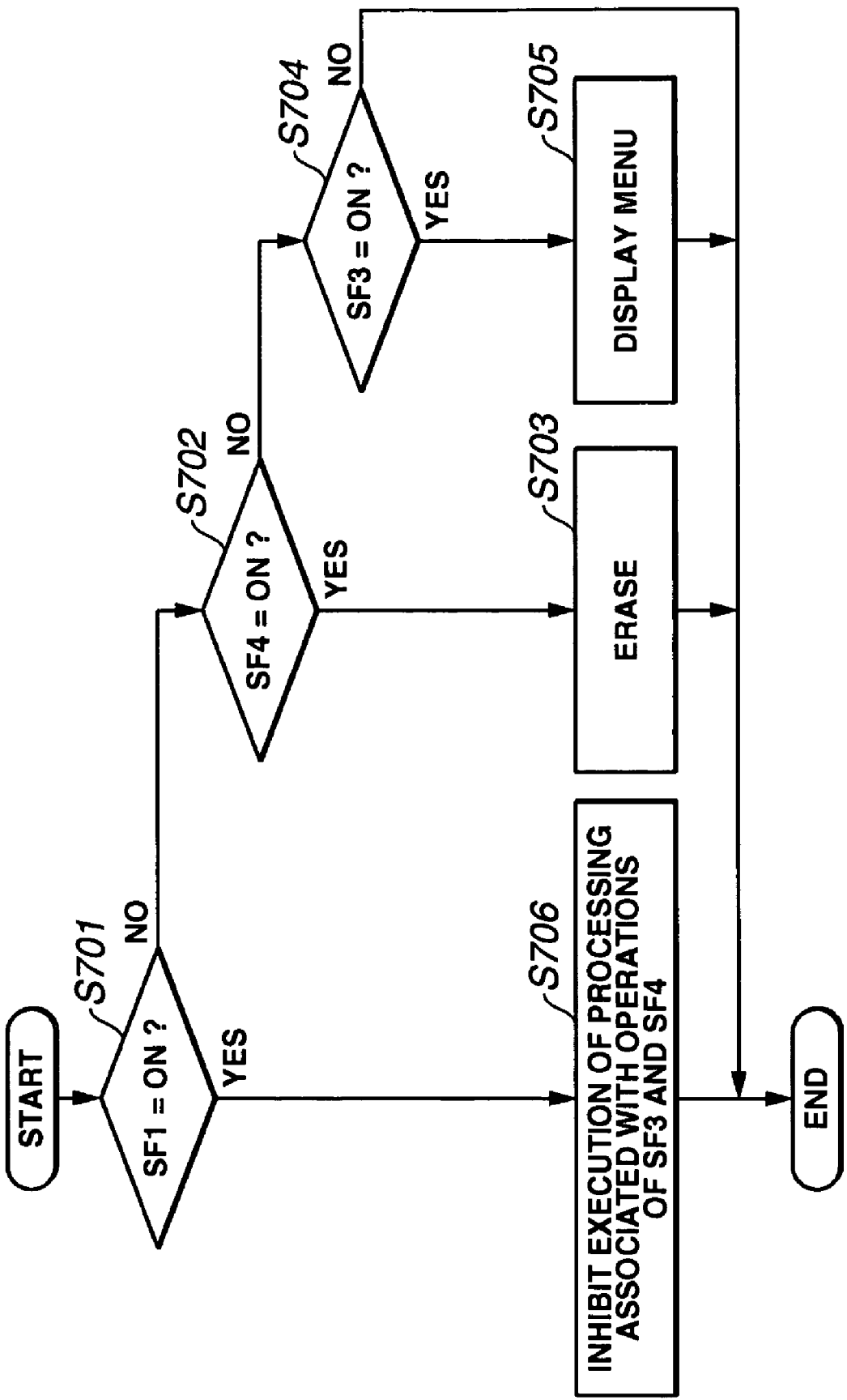
FIG. 8 is a flow chart illustrating the sequence of image erasure and menu display processing executed by a CPU depending on the operating conditions of a switch group.

FIG. 8 is a flow chart illustrating the sequence of image erasure and menu display processing executed by the CPU 100 depending on the operating conditions of the switch group 122.

Referring to FIG. 8, at step S701, the CPU 100 makes a check to determine whether an ON signal has been input from the rotation-angle detecting switch SF1 to the CPU 100. If an ON signal has been input from the rotation-angle detecting switch SF1, the CPU 100 determines that the image capture apparatus is in the self-portrait shooting mode. If an OFF signal has been input from the rotation-angle detecting switch SF1, the CPU 100 determines that the image capture apparatus is in the normal shooting mode. Then, if it is determined that the image capture apparatus is in the self-portrait shooting mode, the flow proceeds to step S706. At step S706, the CPU 100 inhibits execution of processing associated with operations of the switches SF3 and SF4. Then, the CPU 100 brings the flow to an end.

On the other hand, if it is determined at step S701 that the image capture apparatus is in the normal shooting mode, the flow proceeds to step S702. At step S702, the CPU 100 makes a check to determine whether the erase switch SF4 is turned on. If it is determined that the erase switch SF4 is turned on, the flow proceeds to step S703. At step S703, the CPU 100 executes processing for erasing image data that has been last recorded. Then, the CPU 100 brings the flow to an end.

If it is determined at step S702 that the erase switch SF4 is turned off, the flow proceeds to step S704. At step S704, the CPU 100 makes a check to determine whether the menu switch SF3 is turned on. If it is determined that the menu switch SF3 is turned on, the flow proceeds to step S705. At step S705, the CPU 100 causes the monitor 121 to display a menu. The photographer, when viewing the menu displayed on the monitor 121, may give the image capture apparatus instructions to change settings thereof. After completion of processing for changing the settings of the image capture apparatus, the CPU 100 brings the flow to an end.

If it is determined at step S704 that the menu switch SF3 is off, the CPU 100 brings the flow to an end.

As described above, if it is determined that the image capture apparatus is in the self-portrait shooting mode, the step S706 prevents execution of processing associated with any operations of the erase switch SF4 and the menu switch SF3 (processing for erasing image data at the step S703, and processing for displaying a menu and changing settings at the step S705). In other words, since execution of the above processing is unfavorable when the image capture apparatus is in the self-portrait shooting mode, even if the erase switch SF4 or the menu switch SF3 is operated, execution of processing associated with operations of these switches is inhibited. Accordingly, an optimum operating environment can be provided during the self-portrait shooting mode.

Incidentally, the above-described processing for generating a mirror image of the photo-taken image, processing for generating a character information pattern and processing for displaying the OSD lighting indications 401 and 402 shown in FIG. 4 can also be effected at the timing of the step S706.

As described above, according to the exemplary embodiment, when the image capture apparatus is in the self-portrait shooting mode, a character information pattern in such an orientation as to make the character information pattern normally recognizable on the monitor screen can be superimposed on a mirror image of the captured image displayed on the monitor screen, without need for an increase in circuitry scale.

In addition, if a photographer operates, during the self-portrait shooting mode, an operation member that may cause a problem if operated during the self-portrait shooting mode, execution of processing associated with operation of the operation member is inhibited. Accordingly, no problem is caused by any erroneous operation by the photographer.

In addition, a content to be displayed by a display member (indication member) which is located on the back side of the image capture apparatus and which cannot be viewed by a photographer when a monitor section is in the self-portrait shooting posture is displayed on the monitor section in a superimposed fashion during the self-portrait shooting mode. Accordingly, the photographer can notice the above content even during the self-portrait shooting mode.

Furthermore, the present invention can also be achieved by providing a system or apparatus with a storage medium that stores a program code of software for realizing the functions of the above-described embodiment, and causing a computer (or a CPU, MPU or the like) of the system or apparatus to read the program code from the storage medium and then to execute the program code.

In this case, the program code itself read from the storage medium realizes the novel functions of the embodiment, and a storage medium storing the program code and a program containing the program code each constitute the invention.

In addition, the storage medium for providing the program code includes a flexible disk, a hard disk, an optical disk, a magneto-optical disk, a CD-ROM, a CD-R, a CD-RW, a DVD-ROM, a DVD-RAM, a DVD-RW, a DVD-R, a magnetic tape, a non-volatile memory card, a ROM, etc. . . .

Furthermore, besides the program code read by the computer being executed to realize the functions of the above-described embodiment, the present invention includes an OS (operating system) or the like running on the computer performing an actual process in whole or in part according to instructions of the program code to realize the functions of the above-described embodiment.

Moreover, the present invention also includes a CPU or the like contained in a function expansion board inserted into the computer or in a function expansion unit connected to the computer, the function expansion board or the function expansion unit having a memory in which the program code read from the storage medium is written, the CPU or the like performing an actual process in whole or in part according to instructions of the program code to realize the functions of the above-described embodiment.

The invention has been described in detail with particular reference to an exemplary embodiment thereof, but it will be understood that variations and modifications can be effected within the scope of the invention as described above, and as noted in the appended claims, by a person of ordinary skill in the art without departing from the scope of the invention.

What is claimed is:

1. An image capture apparatus for capturing an image of a subject by a user, the image capture apparatus comprising:
an image capture device operable to capture the image and output an image signal corresponding to the captured image;
a display device operable to display a displayed image;
a reversing device operable to generate a mirror image of the captured image from the image signal;
a controller controlling the display device to display the displayed image,
wherein the display device is rotatably coupled to the image capture device such that the display device can rotate between first and second positions,
wherein the image capture device includes a back side facing the user and a front side facing the subject,
wherein the display device faces the user in the first position and faces the subject in the second position;
an operation device provided at the back side of the image capture device and operable by a user to control an operation; and
an inhibition device inhibiting operation of the operation device by the user responsive to the display device being in the second position.

2. An image capture apparatus according to claim 1, wherein the operation includes an operation for erasing image data.

3. An image capture apparatus according to claim 1, wherein the operation includes an operation for displaying a menu.

4. An image capture apparatus according to claim 1, wherein the operation includes an operation for changing settings.

5. An image capture apparatus for capturing an image of a subject by a user, the image capture apparatus comprising:
an image capture device operable to capture the image and output an image signal corresponding to the captured image;
a display device operable to display a displayed image;
a reversing device operable to generate a mirror image of the captured image from the image signal;
a controller controlling the display device to display the displayed image,
wherein the display device is rotatably coupled to the image capture device such that the display device can rotate between first and second positions,
wherein the image capture device includes a back side facing the user and a front side facing the subject,
wherein the display device faces the user in the first position and faces the subject in the second position,
wherein the controller controls the display device to display the displayed image including an operation condition display pattern corresponding to an operating condition of the image capture apparatus responsive to the display device being in the second position; and
a condition display device mounted on the back side of the image capture device operable to display the operating condition of the image capture apparatus responsive to the display device being in the first position.

6. An image capture apparatus according to claim 5, wherein the operating condition includes a state of focusing.

7. An image capture apparatus according to claim 5, wherein the operating condition includes a state of shake.

8. An image display method for use with an image capture apparatus having an image capture device operable to capture an image of a subject and output an image signal corresponding to the captured image, and a display device, the image display method comprising the steps:
generating a mirror image of the captured image from the image signal;
displaying the mirror image on the display device,
wherein the display device is rotatably coupled to the image capture device such that the display device can rotate between first and second positions;
detecting the position of the display device;
responsive to detecting the display device in the first position, displaying the captured image on the display device;
responsive to detecting the display device in the second position, displaying the mirror image on the display device,
wherein the image capture apparatus includes an operation device operable by a user to execute an operation; and
inhibiting execution of the operation responsive to detecting the display device in the second position even if the operation device is operated by the user.

9. An image display method for use with an image capture apparatus having an image capture device operable to capture an image of a subject and output an image signal corresponding to the captured image, and a display device, the image display method comprising the steps:
generating a mirror image of the captured image from the image signal;
displaying the mirror image on the display device,
wherein the display device is rotatably coupled to the image capture device such that the display device can rotate between first and second positions;
detecting the position of the display device;
responsive to detecting the display device in the first position, displaying the captured image on the display device;
responsive to detecting the display device in the second position, displaying the mirror image on the display device,
wherein the image capture apparatus includes a condition display device mounted on a back side of the image capture device;
notifying the user of an operating condition via the condition display device responsive to detecting the display device in the first position; and
notifying the user of the operation condition by generating a condition display pattern and displaying the condition display pattern on the display device responsive to detecting the display device in the second position.

10. A program stored on a computer-readable medium and executable by a computer to perform image display in an image capture apparatus having an image capture device operable to capture an image of a subject and output an image signal corresponding to the captured image, and a display device, the program, when executed, performing the steps comprising:
generating a mirror image of the captured image from the image signal; and displaying the mirror image on the display device,
wherein the display device is rotatably coupled to the image capture device such that the display device can rotate between first and second positions;
detecting the position of the display device;
responsive to detecting the display device in the first position, displaying the captured image on the display device;

responsive to detecting the display device in the second position, displaying the mirror image on the display device, wherein the image capture apparatus includes an operation device operable by a user to execute an operation; and inhibiting execution of the operation responsive to detecting the display device in the second position even if the operation device is operated by the user.

11. A program stored on a computer-readable medium and executable by a computer to perform image display in an image capture apparatus having an image capture device operable to capture an image of a subject and output an image signal corresponding to the captured image, and a display device, the program, when executed, performing the steps comprising:

generating a mirror image of the captured image from the image signal; and displaying the mirror image on the display device, wherein the display device is rotatably coupled to the image capture device such that the display device can rotate between first and second positions;

detecting the position of the display device;

responsive to detecting the display device in the first position, displaying the captured image on the display device;

responsive to detecting the display device in the second position, displaying the mirror image on the display device, wherein the image capture apparatus includes a condition display device mounted on a back side of the image capture device;

notifying the user of an operating condition via the condition display device responsive to detecting the display device in the first position; and notifying the user of the operation condition by generating a condition display pattern and displaying the condition display pattern on the display device responsive to detecting the display device in the second position.

* * * * *